United States Patent [19]
Ishida

[11] 3,903,832
[45] Sept. 9, 1975

[54] WATER SURFACE GLIDING VEHICLE

[76] Inventor: Choshichi Ishida, 82 5-chome, Shinmachi-dori, Nishi-ku, Osaka, Japan

[22] Filed: June 22, 1973

[21] Appl. No.: 372,605

[30] Foreign Application Priority Data
Oct. 19, 1972 Japan.............................. 47-104747
Feb. 8, 1973 Japan.............................. 48-15807
Feb. 9, 1973 Japan.............................. 48-16259

[52] U.S. Cl............. 115/1 C; 114/67 A; 114/66.5 R
[51] Int. Cl........................................ B63b 1/38
[58] Field of Search ...... 115/1 C, 11, 15; 114/67 A, 114/67 R, 66.5 R, 66.5 S, 66.5 P; 244/23 R; 180/7 R, 7 P, 116

[56] References Cited
UNITED STATES PATENTS

| | | | |
|---|---|---|---|
| 1,760,484 | 5/1930 | Dudley | 114/66.5 R |
| 2,993,462 | 7/1961 | Gough | 114/67 A |
| 3,140,687 | 7/1964 | Beardsley | 114/67 A |
| 3,174,573 | 3/1965 | Chaplin | 244/23 R |
| 3,342,278 | 9/1967 | Cocksedge | 114/67 A |
| 3,476,069 | 11/1969 | Mantle et al | 114/67 A |
| 3,481,297 | 12/1969 | Mantle | 114/67 A |
| 3,561,558 | 2/1971 | Parkhouse | 180/116 |
| 3,583,520 | 6/1971 | Kirpitznikoff | 114/67 A |
| 3,662,854 | 5/1972 | Bertin | 180/116 |
| D160,031 | 9/1950 | Sundstedt | 115/1 C |

FOREIGN PATENTS OR APPLICATIONS
136,636 5/1960 U.S.S.R............................ 114/67 A
1,281,653 12/1961 France .............................. 244/23 R

OTHER PUBLICATIONS

*Hovering Craft and Hydrofoil*, November, 1962, Vol. 2, No. 2, pp. 18–22.
*Flight*, International Supplement, August, 1962, p. 26.
*U.S. Naval Institute Proceedings*, October, 1961, Vol. 87, No. 10, pp. 12, 13.
*Hovering Craft and Hydrofoil*, August–September, 1962, pp. 18–20.

*Primary Examiner*—Trygve M. Blix
*Assistant Examiner*—Edwrd R. Kazenske
*Attorney, Agent, or Firm*—Steward and Kolasch, Ltd.

[57] ABSTRACT

A vehicle which can be propelled across the surface of water which comprises a vehicle hull, at least a portion of the front end of said hull being inclined downwardly and in the rearward direction of the vehicle, forward propulsion device provided at the top portion of the vehicle hull and a channel disposed in the rear portion of the vehicle hull and extending through the hull from the top to the bottom thereof, the channel being provided with device for jetting air downwardly toward the rear portion of the vehicle hull.

8 Claims, 12 Drawing Figures

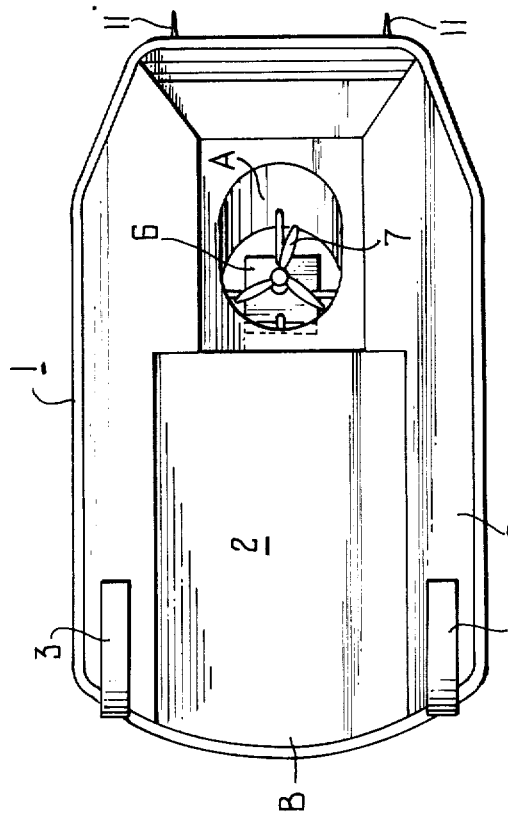
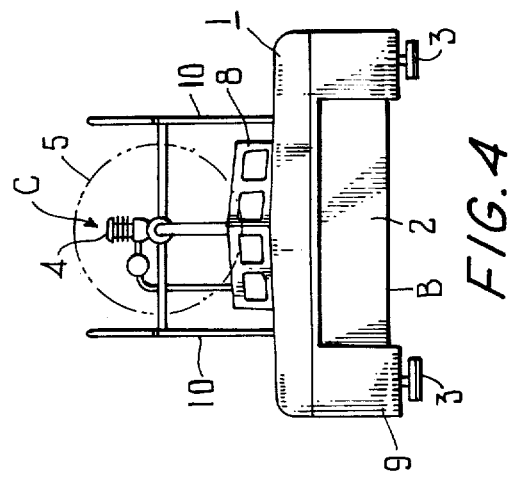
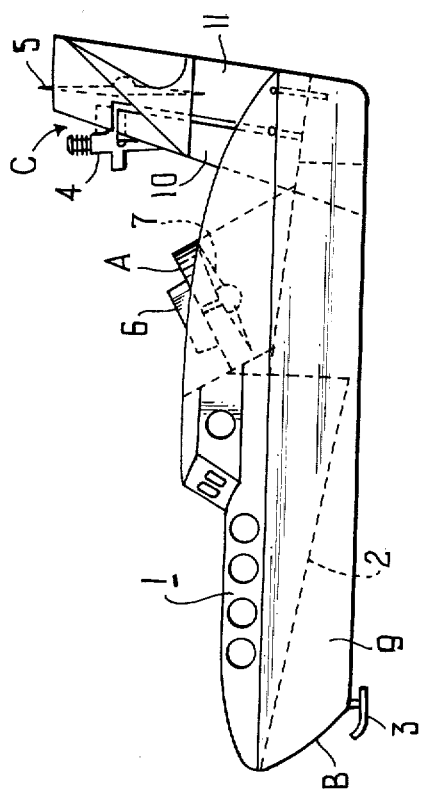
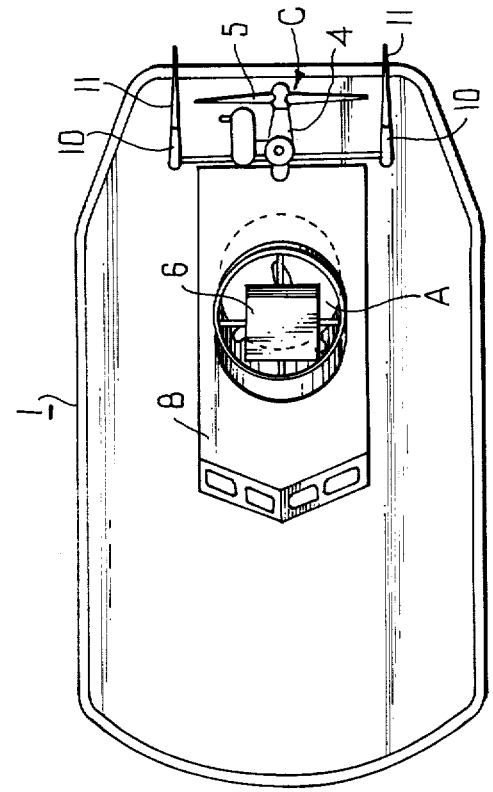

WATER SURFACE GLIDING VEHICLE

BACKGROUND AND SUMMARY OF THE INVENTION

The present invention relates to a new type of vehicle for running on water at a slow speed and for gliding over the surface of water at high speeds.

Conventionally, a hydrofoil craft or a boat propelled on a cushion of air have been employed as high speed vehicles for traveling on the water surface. However, the hydrofoil craft has the disadvantage that materials floating on the surface of the water, such as, for example, driftwood, etc., strike against the hydrofoil or its supporting members. Furthermore, plastic bags or sheets floating in the water tend to become entangled in the propeller of the motor, thereby rendering the hydrofoil craft inoperable. An air cushion gliding boat where the hull of the boat is normally floated over the surface of the water on a cushion of air has the disadvantage that it is difficult to maintain proper balance while cruising at low speeds when compared with the operation of a normal boat. Also, a so-called pitching action can be readily produced at high speeds. The apparatus of the present invention overcomes the above-mentioned disadvantages.

Accordingly, an object of the present invention is to provide a water surface gliding vehicle which can glide on the surface of the water at high speeds while avoiding the normal resistance of the water.

Another object of the present invention is to provide a water surface gliding vehicle possessing superior safety features because it cannot be damaged, even when the hydrofoil or the supporting legs strike materials floating on the water surface.

A further object of the present invention is to produce a water vehicle which provides a comfortable ride with less pitching action.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a side view of one of the preferred embodiments in accordance with the present invention;

FIG. 2 is a top or plan view of FIG. 1;

FIG. 3 is a bottom view of FIG. 1;

FIG. 4 is a front view of FIG. 1;

DESCRIPTION OF THE PREFERRED EMBODIMENTS

Figure 5:
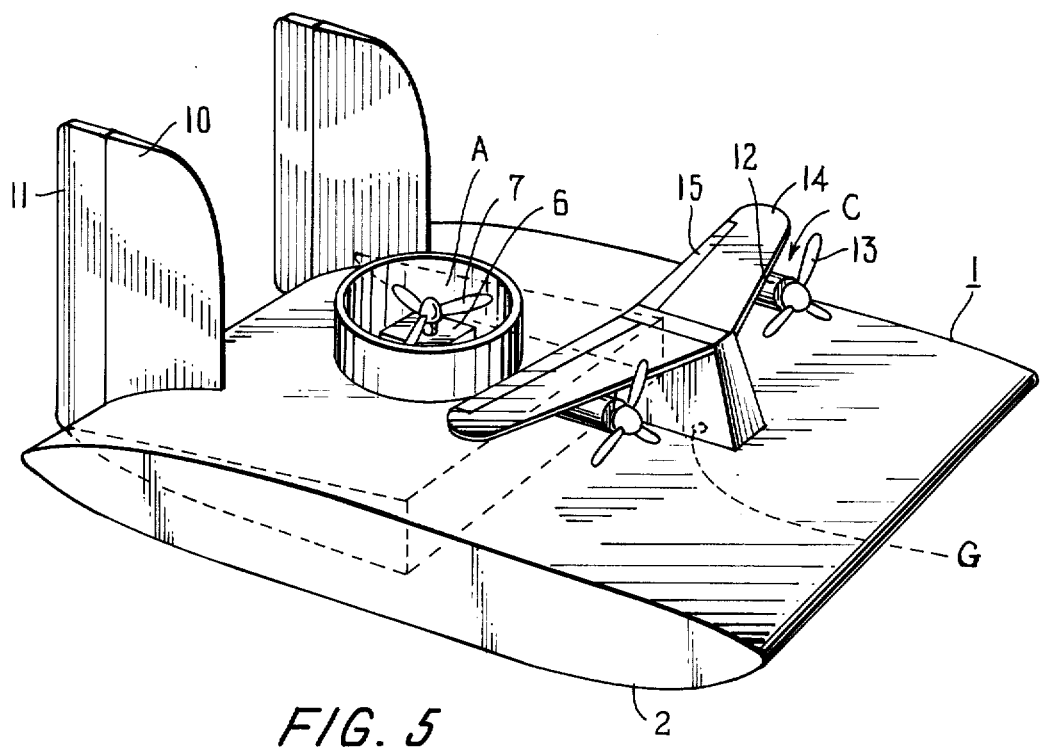
FIG. 5 is a perspective view of another embodiment of the present invention.

Referring now to FIGS. 1 to 4, a forward propulsion means C which is composed of an engine 4 and a propeller 5 is supported by a pair of right and left vertical tail planes 10 at the top rear face portion of the vehicle hull 1. A channel A which is slightly inclined from the vertical is provided in the rear half portion of the hull 1 and an engine 6 provided with a propeller 7 is disposed inside said channel. The underside portion of the vertically inclined channel A is of the so-called pressure type which is open across the entire area in the longitudinal direction in the rear half portion of the hull 1 so that the air may be jetted in the downward direction. The lift portion B of the hull is composed of an inclined face 2 which floats or supports the front half portion of the vehicle while running at a high speed. A float 9 is provided on both sides of the inclined surface 2 on the bottom portion of the vehicle hull 1. A vertical tail plane 10, which serves to maintain the lateral stability of the hull, is provided with a rudder 11.

The function of the water surface gliding vehicle of the present invention will now be described. First of all, the engine 4 of the forward propulsion means C and the engine 6 inside the vertical channel A are started. The speed of the vehicle is gradually increased by the forward propulsion means C. While cruising at a low speed, the vehicle hull, which can be provided with a cabin 8, is safely stabilized against any cross gusts of wind by the floats 9 which are in contact with the water. As the speed is gradually increased, the flow of air strikes against the inclining face 2 of the lifting portion B of the vehicle. Thus the front half portion of the vehicle hull 1 is given an upward force which tends to cause the front portion of the vehicle to float on the surface of the water. At this time, the output of the engine 6 is increased so as to jet the air from the vertically disposed channel A downwardly toward the rear half portion of the vehicle hull 1. Thus, the rear half portion of the vehicle hull 1 tends to float on the surface of the water so that the entire hull 1 of the vehicle skims across the surface of the water at a high speed with only the gliding plates 3 of the hull being in contact with the water surface. The lateral stability of the vehicle hull 1 is ensured during high speed operation by the vertical tail plane 10. Since the forward propulsion means C is located above the vehicle hull 1, debree such as plastic bags, papers sheets, and the like floating on the surface of the water do not become entangled around the hydrofoil or the supporting legs. Since the front half portion of the vehicle hull 1 receives an upward force through the lifting portion B, the vehicle can cruise safely at a high speed, while easily riding over obstacles such as driftwood and the like.

Figure 6:
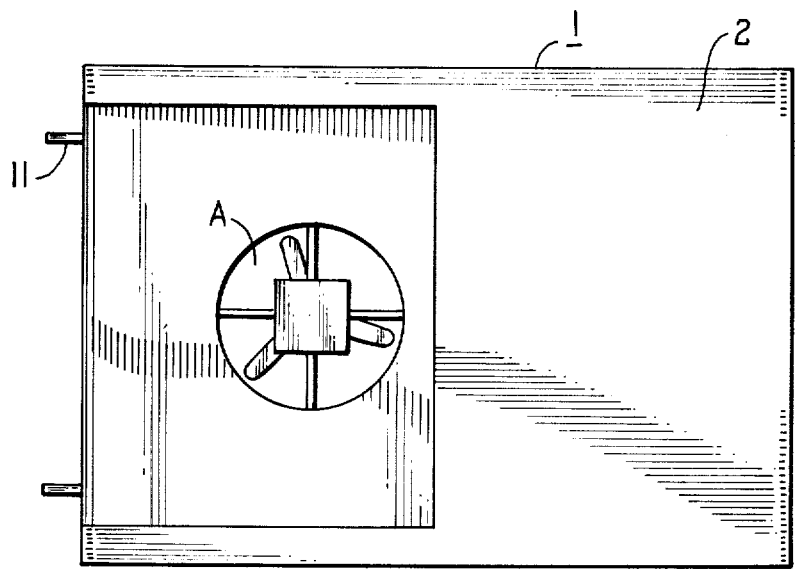
FIG. 6 is a bottom view of the apparatus of FIG. 5.

FIGS. 5 and 6, respectively, show another embodiment of the present invention. A forward propulsion force is produced by two engines 12 provided with propellers 13 mounted in parallel and equidistant from the center of gravity line G on the top surface of the vehicle hull 1. A pressure type vertical channel A is provided with an engine 6 and associated propeller 7 disposed therein. The vertical channel is adapted to be associated with various units, e.g., a cabin, etc. A floating wing 14 which is mounted behind the forward propulsion means C is provided with an upper and lower rudder wing 15. A vertical tail plane 10 serves to maintain the lateral stability of the vehicle hull 1 while the vehicle is running and furthermore controls the direction of the vehicle through the use of a rudder portion 11. Also, the inclined bottom face 2 in the front half portion of the vehicle hull 1 functions, also, to provide lift for the front half portion of the vehicle hull 1. In this embodiment, the pitching action is not produced in the vehicle hull 1, even at high speed operation, because of the action of the floating wing 14. The lateral stability of the vehicle hull 1 is also maintained during high speed operation by the vertical tail plane 10.

Figure 7:
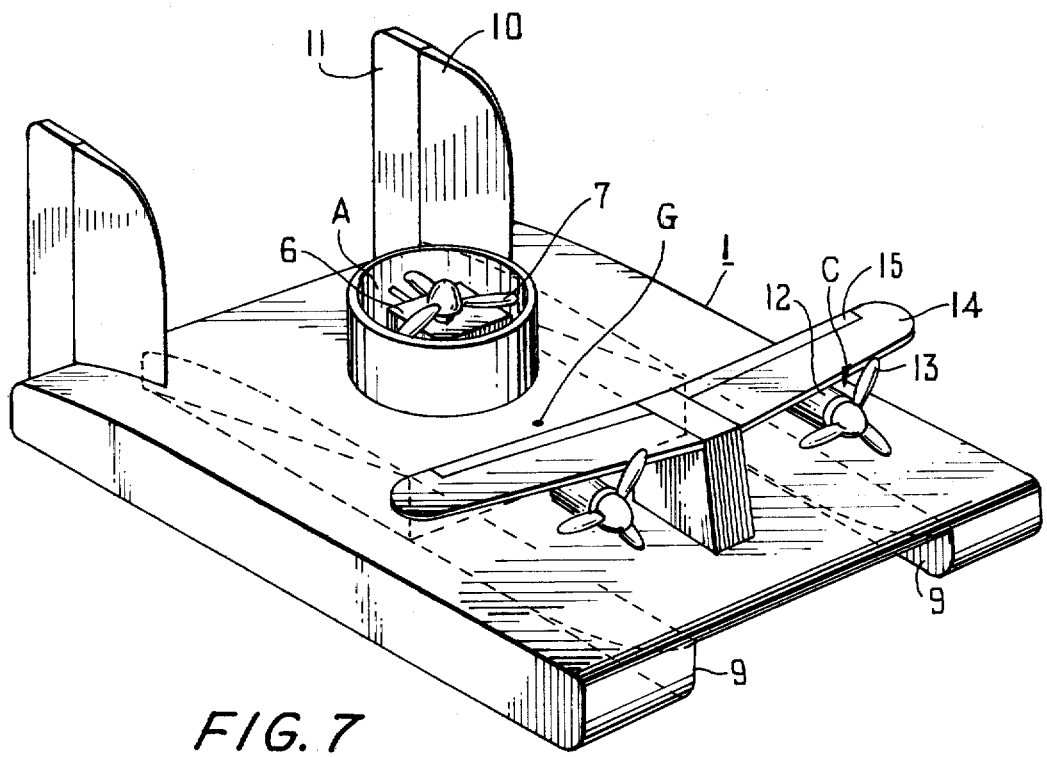
FIG. 7 is a perspective view of still another embodiment of the present invention.
Figure 8:
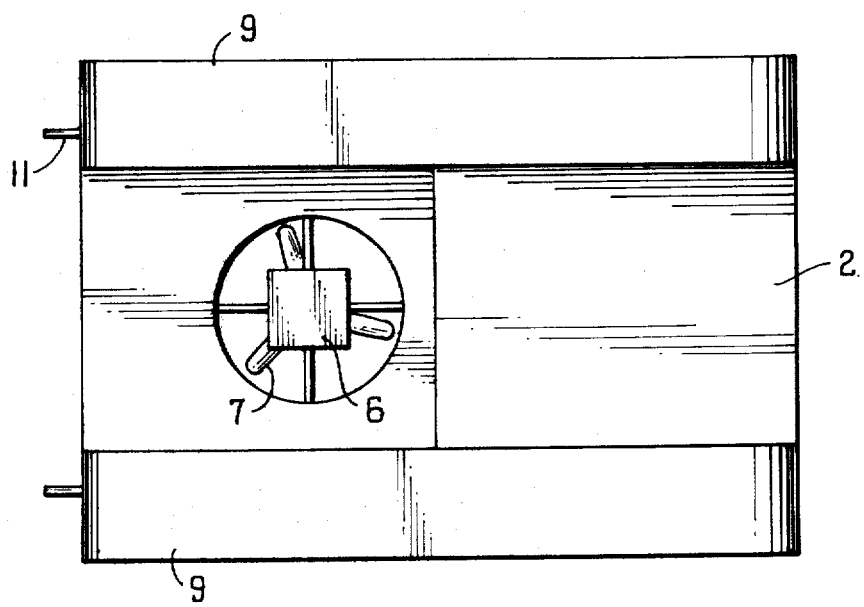
FIG. 8 is a bottom view of the apparatus of FIG. 7.

FIGS. 7 and 8, respectively, show a further embodiment of the present invention. The forward propulsion means C are disposed in the forward portion of the vehicle from a center of gravity line G on the top surface of the vehicle hull 1, and floating members 9 are provided on each side of the bottom face of the vehicle hull 1 thereby covering both sides of the vertical channel A. Since the forward propulsion means C is provided in a location forward of the center of gravity line G of the vehicle hull 1, the floating wing 14 is provided behind the forward propulsion means C and provides sufficient lift to enable the front-half portion of the vehicle hull 1 to float on air. The float members 9 function to provide the lifting force at the time when the vehicle 1 is not moving or is traveling at a low speed. The air to be jetted downwardly from the vertical channel A passes into a zone between the bottom face of the float members 9 and the water surface thereby producing an outward flow causing the rear half portion of the vehicle hull 1 to float on the water surface. As noted in FIGS. 7 and 8, the stationary side edge float surfaces 9 define two inclined portions of the hull centrally disposed therebetween, that is, a front inclined portion and a rear inclined portion. Both of these inclined portions of the hull are inclined downwardly and in the rearward direction of the water vehicle and are separated from each other by a step portion. Advantageously, the step portion is disposed about midway between the front and rear portions of the vehicle.

Figure 10:
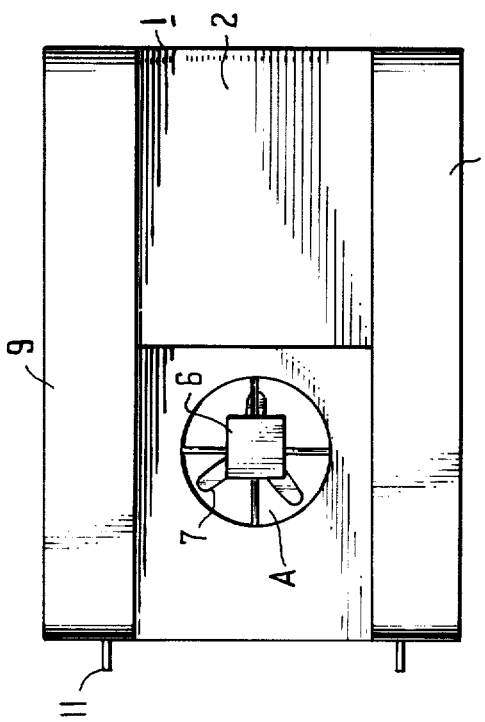
FIG. 10 is a bottom view of the apparatus of FIG. 9.
Figure 9:
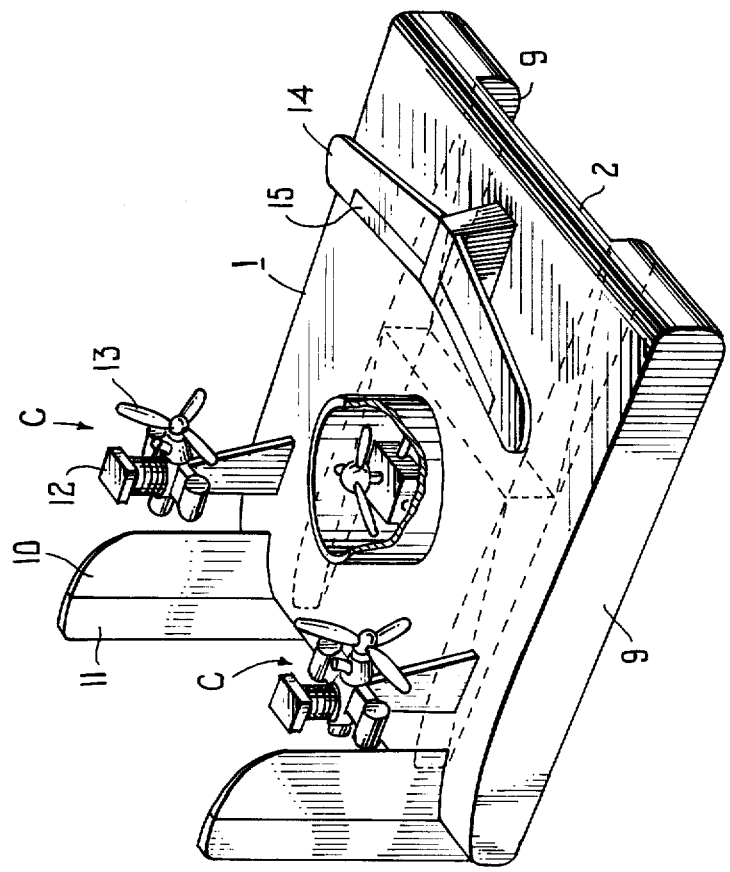
FIG. 9 is a perspective view of still another embodiment of the present invention.

FIGS. 9 and 10, respectively, show still another embodiment of the present invention wherein the forward propulsion means C is disposed in the rear portion of the vehicle hull 1 and the floating wing 14 is mounted on the front half portion of the vehicle hull 1.

Figure 11:
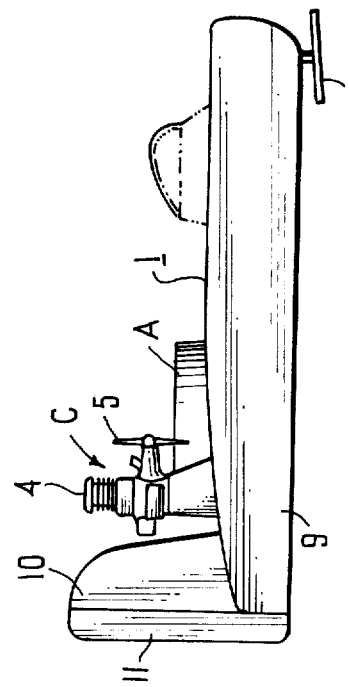
FIG. 11 is a side view of the apparatus of FIG. 9.

FIG. 11 shows a vehicle which is provided with a gliding plate 3 so that it may run smoothly along the water surface without causing a pitching action. The gliding plate 3 is composed of a supporting leg and a gliding plate, respectively, mounted at the front lower end portion of the vehicle hull 1. The gliding plate may be built on the bottom face of the vehicle hull 1.

Figure 12:
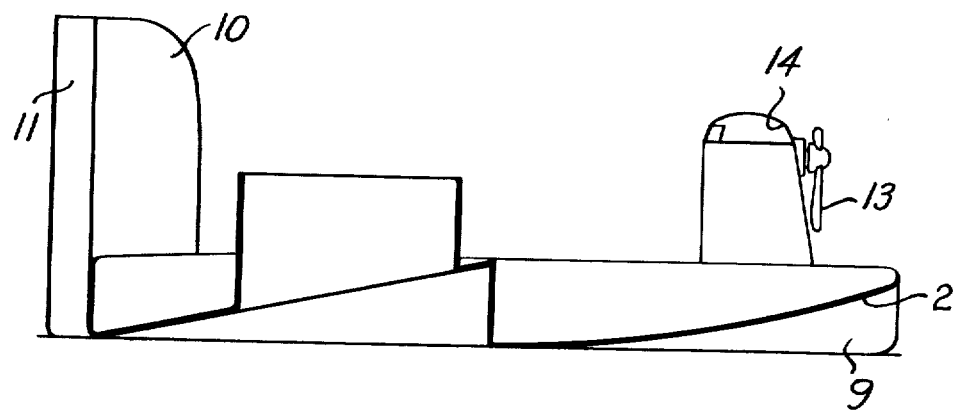
FIG. 12 is a profile view showing with heavy lines, the centrally inclined portions of the vehicle hull.

FIG. 12 merely shows more clearly, because of the darkened lines, how the inclined portions of the central portion of the hull are sloped.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A vehicle which can be propelled across the surface of water which comprises a vehicle hull having a central portion with a front end portion, a rear end portion, a top portion and a bottom portion, forward propulsion means provided on the top portion of the vehicle hull and a channel disposed in the rear end portion of the vehicle hull and extending through the hull from the top to the bottom thereof, said channel containing means for jetting air in the downward direction, said central portion having stationary side floats extending the entire length of the central portion and inclined portions centrally disposed therebetween, said inclined portions including a front and rear inclined portion, said front inclined portion being inclined downwardly and in the rearward direction of the vehicle hull and said rear inclined portion being inclined downwardly and in the rearward direction of the vehicle hull, said front and rear end inclined portions being separated by a step portion, said front end inclined portion and said floats defining a front zone which imparts lift to the front half of the hull and said rear end inclined surface and said floats defining a rear zone for providing lift to the rear half of the hull by said jetting means which jets air into said rear zone.

2. The vehicle of claim 1, wherein the hull is provided with a pair of tail planes which extend substantially vertically from the rear end portion of the vehicle hull.

3. The vehicle of claim 2, wherein the tail planes are provided with rudder means.

4. The vehicle of claim 1, wherein both the forward propulsion means and the air jetting means comprise engine means provided with a propeller.

5. The vehicle of claim 1, wherein a floating wing is disposed in the front portion of the vehicle hull and extends above the upper surface of the hull, said floating wing containing the forward propulsion means.

6. The vehicle of claim 5 wherein two propulsion means are suspended from the floating wing equi distant from the center of the wing.

7. The vehicle of claim 5, wherein the floating wing is provided with flap means.

8. The vehicle of claim 1, wherein the step portion is disposed about midway between the front and rear portions of the vehicle.

* * * * *